US012620348B2

(12) United States Patent
Lin et al.

(10) Patent No.: US 12,620,348 B2
(45) Date of Patent: May 5, 2026

(54) DISPLAY DEVICE AND DRIVING METHOD FOR DRIVING DISPLAY PANEL

(71) Applicant: AUO Corporation, Hsinchu City (TW)

(72) Inventors: Shin-Ru Lin, Hsinchu City (TW); Yi-Fu Ou, Hsinchu City (TW); Chang Chen, Hsinchu City (TW); Ji-Yun You, Hsinchu City (TW); Yu-Wei Chang, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/944,001

(22) Filed: Nov. 12, 2024

(65) Prior Publication Data

US 2026/0073843 A1 Mar. 12, 2026

(30) Foreign Application Priority Data

Sep. 9, 2024 (TW) ................................ 113134101

(51) Int. Cl.
*G09G 3/32* (2016.01)

(52) U.S. Cl.
CPC ....... *G09G 3/32* (2013.01); *G09G 2300/0852* (2013.01); *G09G 2310/0259* (2013.01); *G09G 2310/027* (2013.01); *G09G 2310/061* (2013.01); *G09G 2320/0285* (2013.01); *G09G 2320/0626* (2013.01)

(58) Field of Classification Search
CPC ............. G09G 3/32; G09G 2300/0852; G09G 2310/0259; G09G 2310/027; G09G 2310/061; G09G 2320/0285; G09G 2320/0626
See application file for complete search history.

(56) References Cited

U.S. PATENT DOCUMENTS

| | | | | |
|---|---|---|---|---|
| 2010/0045690 | A1* | 2/2010 | Handschy | G09G 3/3629 345/545 |
| 2020/0074911 | A1* | 3/2020 | Park | H04N 21/4318 |
| 2022/0180801 | A1* | 6/2022 | Kim | G09G 3/32 |
| 2022/0246088 | A1* | 8/2022 | Zhai | G09G 3/32 |

(Continued)

FOREIGN PATENT DOCUMENTS

| | | | |
|---|---|---|---|
| TW | 202424929 | A | 6/2024 |
| TW | 202429424 | A | 7/2024 |
| TW | I849815 | B | 7/2024 |

*Primary Examiner* — Ke Xiao
*Assistant Examiner* — Jennifer L Zubajlo
(74) *Attorney, Agent, or Firm* — WPAT, PC

(57) ABSTRACT

A display device includes a display panel and a control system. The display panel includes multiple pixel groups. Each pixel group includes several sub-pixel circuits and a pulse width modulation (PWM) circuit. The sub-pixel circuit receives pulse amplitude modulation (PAM) data and controls the luminous intensity. The PWM circuit receives PWM data and controls the luminous time. The control system is used to receive image information that includes current grayscale values of the sub-pixel circuits; to establish the PWM data based on the current grayscale values through a first look-up table; to convert the current grayscale values to target grayscale values through a second look-up table, in which the target grayscale values corresponds to the PAM data; and to output image information including the PWM data and the target grayscale value.

15 Claims, 14 Drawing Sheets

(56) References Cited

U.S. PATENT DOCUMENTS

| | | | | |
|---|---|---|---|---|
| 2022/0262305 | A1* | 8/2022 | Chun | G09G 5/10 |
| 2023/0121681 | A1* | 4/2023 | Hwang | G09G 3/32<br>345/55 |
| 2023/0186836 | A1* | 6/2023 | Jeong | G09G 3/2081<br>345/55 |
| 2023/0222975 | A1* | 7/2023 | Lee | G09G 3/32<br>345/691 |
| 2023/0282167 | A1* | 9/2023 | Shih | G09G 3/3258<br>345/691 |
| 2023/0290004 | A1* | 9/2023 | Xu | G06T 7/90 |
| 2023/0395012 | A1* | 12/2023 | Lyu | G09G 3/2081 |
| 2024/0185761 | A1* | 6/2024 | Liao | G09G 3/32 |
| 2024/0321181 | A1* | 9/2024 | Lin | G09G 3/32 |
| 2024/0355292 | A1* | 10/2024 | Zhai | G09G 3/3233 |
| 2025/0209972 | A1* | 6/2025 | Lin | G09G 3/32 |
| 2025/0265971 | A1* | 8/2025 | Park | G09G 3/2014 |

* cited by examiner

L1

| Step | R1/G1/B1 | R2 | PWM_data | G2 | PWM_data | B2 | PWM_data |
|---|---|---|---|---|---|---|---|
| 4 | 217~255 | 250 | 5.4 | 250 | 5.1 | 250 | 5.2 |
| 3 | 169~216 | 239 | 4.7 | 239 | 4.2 | 239 | 4.5 |
| 2 | 96~168 | 143 | 3.7 | 143 | 3.1 | 143 | 3.4 |
| 1 | 0~95 | 127 | 3.3 | 127 | 2.8 | 127 | 3.3 |

FIG. 10

L2

| R1/G1/B1 | RT/GT/BT | Step |
|---|---|---|
| 0 | 0 | 1 |
| 95 | 95 | 1 |
| 96 | 51 | 2 |
| 168 | 90 | 2 |
| 169 | 71 | 3 |
| 216 | 90 | 3 |
| 217 | 77 | 4 |
| 255 | 91 | 4 |

FIG. 11

DISPLAY DEVICE AND DRIVING METHOD FOR DRIVING DISPLAY PANEL

RELATED APPLICATIONS

This application claims priority to Taiwan Application Serial Number 113134101, filed Sep. 9, 2024, which is herein incorporated by reference.

BACKGROUND

Technical Field

The present disclosure relates to a display device and a driving method of a display panel.

Description of Prior Art

In applications where the display has both high and low grayscale areas (e.g., a dial whose pointers are displayed in a high grayscale area and whose background is displayed in a medium or low grayscale area), a decrease in grayscale value results in a corresponding decrease in the driving current of the light emitting element, which not only increases power dissipation, but also reduces overall efficiency. Both the red, green, and blue pixels show that the lower the driving current, the greater the drop in efficiency, with the red pixel showing the largest drop in efficiency.

SUMMARY

Accordingly, the present disclosure provides a display device. The display device includes a display panel and a control system. The display panel includes multiple sub-pixel circuits and a pulse width modulation circuit. The sub-pixel circuits are configured to each receive a pulse amplitude modulation data and control a luminous intensity of the sub-pixel circuits based on the pulse amplitude modulation data. The pulse width modulation circuit is configured to receive a pulse width modulation data and control a luminous time of the sub-pixel circuits based on the pulse width modulation data. The control system is configured to perform steps including receiving an image information of the display panel, in which the image information includes a current grayscale value of each the sub-pixel circuit; establishing the pulse width modulation data based on the current grayscale value by a first lookup table, in which the first lookup table includes multiple input grayscale values and multiple output pulse width modulation data corresponding to the input grayscale values; converting the current grayscale value to a target grayscale value by a second lookup table, in which the target grayscale value corresponds to the pulse amplitude modulation data, and the second lookup table includes the input grayscale values and multiple output grayscale values corresponding to the input grayscale values; and controlling the display panel to display the image information having the pulse width modulation data and the target grayscale value.

According to one embodiment of the present disclosure, the sub-pixel circuits include a red sub-pixel circuit, a green sub-pixel circuit, and a blue sub-pixel circuit.

According to one embodiment of the present disclosure, the red sub-pixel circuit, the green sub-pixel circuit and the blue sub-pixel circuit are each controlled by different pulse width modulation circuit.

According to one embodiment of the present disclosure, the red sub-pixel circuit, the green sub-pixel circuit and the blue sub-pixel circuit are controlled by the same pulse width modulation circuit.

According to one embodiment of the present disclosure, the control system is further configured to establish the second lookup table, and establishing the second lookup table includes generating multiple grayscale intervals based on a ramp signal and a duty cycle multiplier corresponding to the ramp signal to divide the input grayscale values into the grayscale intervals, in which the duty cycle multiplier corresponding to a first grayscale interval of the grayscale intervals is less than the duty cycle multiplier for the other grayscale intervals; calculating a target brightness of each of the input grayscale values from a gamma curve; and recording the output grayscale values to which the input grayscale values in the other grayscale intervals required to be converted to achieve the target brightness based on the duty cycle multipliers, wherein the output grayscale values are values taken from the input grayscale values in the first grayscale interval.

According to one embodiment of the present disclosure, the input grayscale values in the first grayscale interval include 0 to 95.

According to one embodiment of the present disclosure, the control system further includes a ramp signal generation circuit. The ramp signal generation circuit is configured to generate the ramp signal and provide the ramp signal to the pulse width modulation circuit.

According to one embodiment of the present disclosure, the display device further includes a driving circuit. The driving circuit is electrically connected between the display panel and the control system, and is configured to drive the pixel groups of the display panel.

According to one embodiment of the present disclosure, the pulse width modulation circuit includes a first capacitor, a first transistor, a second transistor, a third transistor, a fourth transistor, and a second capacitor. A first terminal of the first capacitor receives a ramp signal, and a second terminal of the first capacitor is electrically coupled to a first node. A first terminal of the first transistor is electrically coupled to the first node, a second terminal of the first transistor receives the pulse width modulation data, and a control terminal of the first transistor receives a second scanning signal. A first terminal of the second transistor is electrically coupled to a first system voltage, and a control terminal of the second transistor is electrically coupled to the first node. A first terminal of the third transistor is electrically coupled to a second terminal of the second transistor, a second terminal of the third transistor is electrically coupled to a third node, and a control terminal of the third transistor receives an emission signal. A first terminal of the fourth transistor is electrically coupled to the third node, a second terminal of the fourth transistor is electrically coupled to a second system voltage, and a control terminal of the fourth transistor receives a reset signal. A first terminal of the second capacitor is electrically coupled to the third node, and a second terminal of the second capacitor is electrically coupled to the second system voltage.

According to one embodiment of the present disclosure, each of the sub-pixel circuits includes a light emitting element, a fifth transistor, a sixth transistor, a third capacitor, a seventh transistor, an eighth transistor, a ninth transistor, a tenth transistor, and an eleventh transistor. A cathode of the light emitting element receives a third system voltage. A first terminal of the fifth transistor receives a first reference voltage, a second terminal of the fifth transistor is electrically coupled to a fourth node, and a control terminal of the fifth transistor receives the emission signal. A first terminal of the sixth transistor is electrically coupled to the fourth node, a second terminal of the sixth transistor receives the pulse amplitude modulation data, and a control terminal of the sixth transistor receives the second scanning signal. A first terminal of the third capacitor is electrically coupled to the fourth node, and a second terminal of the third capacitor is electrically coupled to a fifth node. A first terminal of the seventh transistor is electrically coupled to the fifth node, a second terminal of the seventh transistor is electrically to a sixth node, and a control terminal of the seventh transistor receives the second scanning signal. A first terminal of the eighth transistor is electrically coupled to the sixth node, a second terminal of the eighth transistor is electrically to a seventh node, and a control terminal of the eighth transistor receives the second scanning signal. A first terminal of the ninth transistor is electrically coupled to the sixth node, a second terminal of the ninth transistor receives a second reference voltage, and a control terminal of the ninth transistor receives a first scanning signal. A first terminal of the tenth transistor receives a fourth system voltage, a second terminal of the tenth transistor is electrically coupled to a seventh node, and a control terminal of the tenth transistor is electrically coupled to the fifth node. A first terminal of the eleventh transistor is electrically coupled to the seventh node, a second terminal of the eleventh transistor is electrically coupled to an anode of the light emitting element, and the control terminal of the eleventh transistor is electrically coupled to the third node.

The present disclosure provides a driving method of a display panel including multiple pixel groups, in which each of the pixel groups includes multiple sub-pixel circuits. The driving method includes receiving an image information of the display panel, in which the image information includes a current grayscale value of each of the sub-pixel circuits; establishing a pulse width modulation data based on the current grayscale value by a first lookup table, in which the first lookup table includes multiple input grayscale values and multiple output pulse width modulation data corresponding to the input grayscale values; converting the current grayscale value to a target grayscale value by a second lookup table, in which the target grayscale value corresponds to a pulse amplitude modulation data, and the second lookup table includes the input grayscale values and multiple output grayscale values corresponding to the input grayscale values; and displaying the image information having the pulse width modulation data and the target grayscale value.

According to one embodiment of the present disclosure, the driving method further includes establishing the second lookup table, including generating multiple grayscale intervals based on a ramp signal and a duty cycle multiplier corresponding to the ramp signal to divide the input grayscale values into the grayscale intervals, in which the duty cycle multiplier corresponding to a first grayscale interval of the grayscale intervals is less than the duty cycle multiplier for the other grayscale intervals; calculating a target brightness of each of the input grayscale values from a gamma curve; and recording the output grayscale values to which the input grayscale values in the other grayscale intervals required to be converted to achieve the target brightness based on the duty cycle multipliers, in which the output grayscale values are values taken from the input grayscale values in the first grayscale interval.

According to one embodiment of the present disclosure, the input grayscale values in the first grayscale interval comprise 0 to 95.

According to one embodiment of the present disclosure, the pixel groups further includes at least one pulse width modulation circuit, the sub-pixel circuits include a red sub-pixel circuit, a green sub-pixel circuit and a blue sub-pixel circuit, and the red sub-pixel circuit, the green sub-pixel circuit and the blue sub-pixel circuit are each controlled by different one of the at least one pulse width modulation circuit.

According to one embodiment of the present disclosure, the pixel groups further includes at least one pulse width modulation circuit, the sub-pixel circuits include a red sub-pixel circuit, a green sub-pixel circuit and a blue sub-pixel circuit, and the red sub-pixel circuit, the green sub-pixel circuit and the blue sub-pixel circuit are controlled by the same one of the at least one pulse width modulation circuit.

BRIEF DESCRIPTION OF THE DRAWINGS

For a clearer and easier understanding of the above and other objects, features, advantages, and embodiments of the present disclosure, the drawings are described below:

FIG. 10 is a schematic diagram of a first lookup table according to an embodiment of the present disclosure.

FIG. 11 is a schematic diagram of a second lookup table according to an embodiment of the present disclosure.

DETAILED DESCRIPTION

Figure 1:
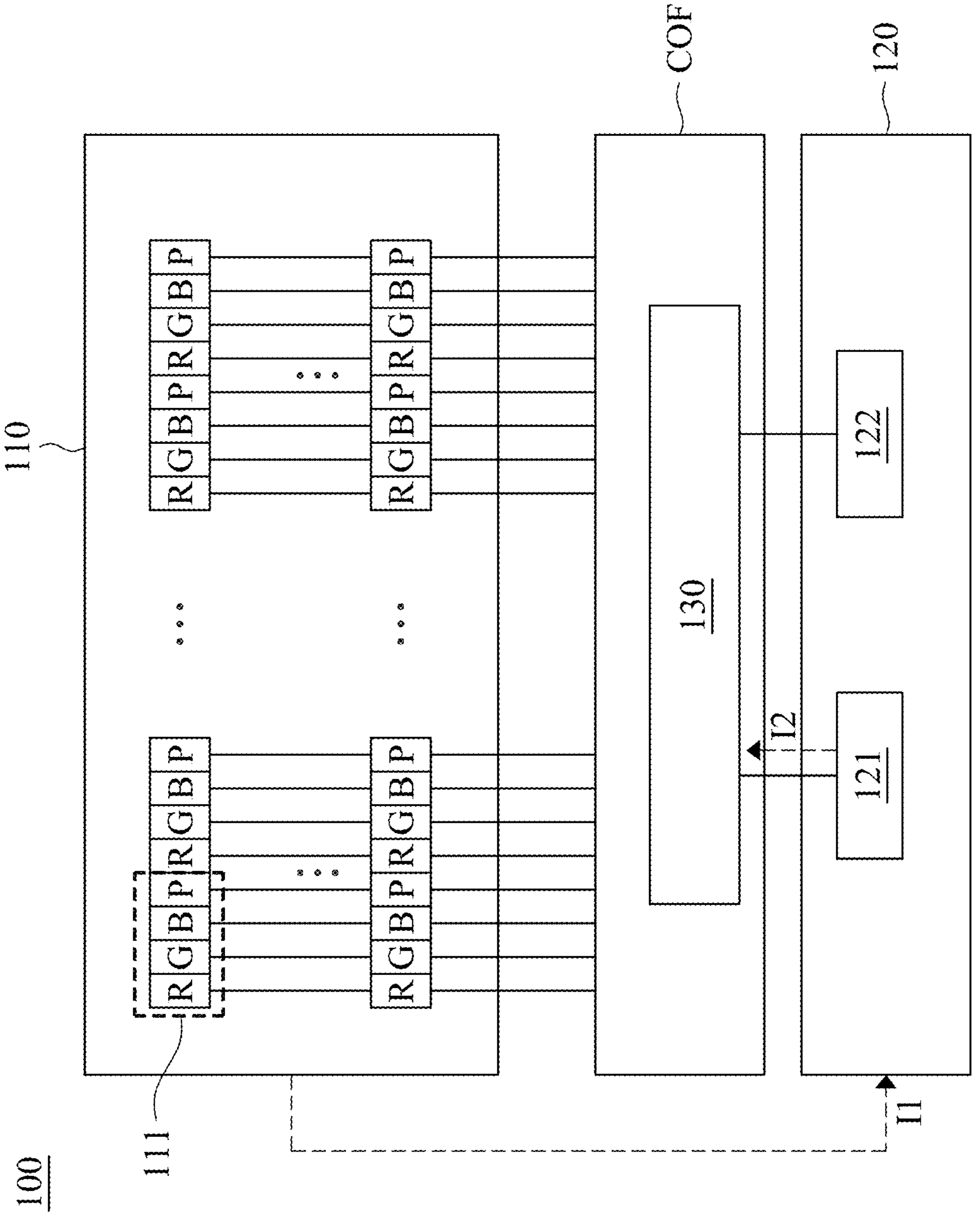
FIG. 1 is a schematic diagram of a display device according to an embodiment of the present disclosure.

Various embodiments or examples are provided below for implementing different features of the provided disclosure. The embodiments of components and configurations described below are examples only and are not intended to be restrictive. In addition, for the purpose of simplification and clarity, the present disclosure repeats reference numerals and/or numbers in each example in the present disclosure, and this repetition does not in itself limit the relationship between various embodiments and/or components discussed.

Referring to FIG. 1, FIG. 1 is a schematic diagram of a display device according to an embodiment of the present disclosure. The display device 100 includes a display panel 110 and a control system 120. The display panel 110 includes several pixel groups 111 arranged in columns and rows, and each of the pixel groups 111 includes sub-pixel circuits R, G, and B, and a pulse width modulation (PWM) circuit P. The sub-pixel circuits R, G, and B may represent a red sub-pixel, a green sub-pixel, and a blue sub-pixel, respectively, and the red sub-pixel, the green sub-pixel, and the blue sub-pixel constitute a basic unit pixel on the display panel 110.

The pulse width modulation circuit P occupies a pixel space on the display panel 110 as the sub-pixel circuits R, G, and B. In other word, the PWM circuit P increases a resolution of the image information of the display panel 110. For example, but is not limited to, the resolution of the image information is [H]×[W] when the PWM circuit P is not included, and the resolution of the image information is [H]×[W+(W/6)×2] when the PWM circuit P is included.

The display device 100 further includes a driving circuit 130. The driving circuit 130 is disposed between the display panel 110 and the control system 120 and is configured to drive light emitting elements in the pixel groups 111. The driving circuit 130 receives the image information I2 with the pulse width modulation data PWM_data and the pulse amplitude modulation data PAM_data from the control system 120, and controls an amplitude and a width of a driving current flowing through the light emitting element for controlling a luminous time and a luminous intensity of the light emitting element based on the pulse width modulation data PWM_data and the pulse amplitude modulation data PAM_data. In an embodiment of the present disclosure, the driving circuit 130 may be configured on a thin film, which is constructed, for example, as a chip on film (COF).

In the embodiment of the present disclosure, the control system 120 further includes an operating module 121. The operating module 121 is used to generate new image information I2 by calculating the pulse width modulation data PWM_data and pulse amplitude modulation data PAM_data from the image information I1 received by the control system 120. Specifically, the operating module 121 receives the grayscale values of the sub-pixel circuits R, G, B and establishes the pulse width modulation data PWM_data by referring to a built-in first lookup table L1, and adjusts the grayscale values of the sub-pixel circuits R, G, B to target grayscale values by referring to a built-in second lookup table, so that the final output image information I2 includes the pulse width modulation data PWM_data and the pulse amplitude modulation data PAM_data.

In the embodiment of the present disclosure, the control system 120 further includes a ramp signal generation circuit 122. The ramp signal generation circuit 122 is configured to generate the ramp signal SWEEP to the pulse width modulation circuit P, so that the PWM circuit P may synthesize a required control signal PEM based on the ramp signal SWEEP and the pulse width modulation data PWM_data to further control the luminous time of the light emitting elements in the sub-pixel circuits R, G and B.

Figure 2A:
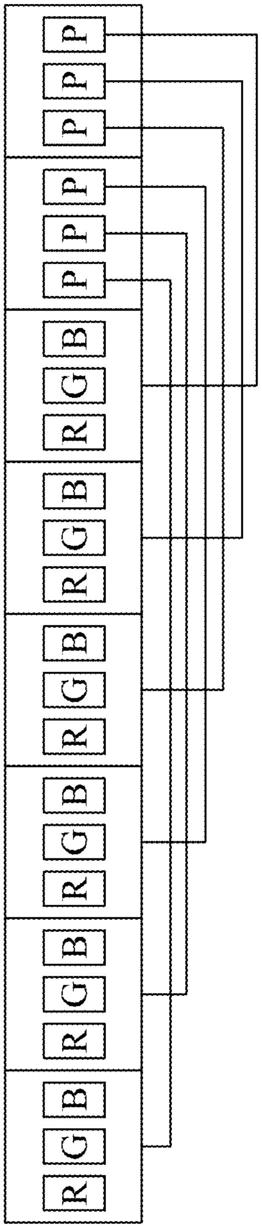
FIGS. 2A to 2B are schematic diagrams of a pulse width modulation circuit controlling sub-pixel circuits according to an embodiment of the present disclosure.

Referring to FIG. 2A, FIG. 2A is a schematic diagram of the PWM circuit P controlling the sub-pixel circuits R, G, and B according to an embodiment of the present disclosure. In the example of FIG. 2A, one PWM circuit P can be used to control a basic unit pixel including a sub-pixel circuit R, a sub-pixel circuit G, and a sub-pixel circuit B. In the embodiment of the present disclosure, each PWM circuit P occupies a pixel space (i.e., a physical position on the display panel 110) with the same area as that of one sub-pixel circuit R, G, or B.

Figure 2B:
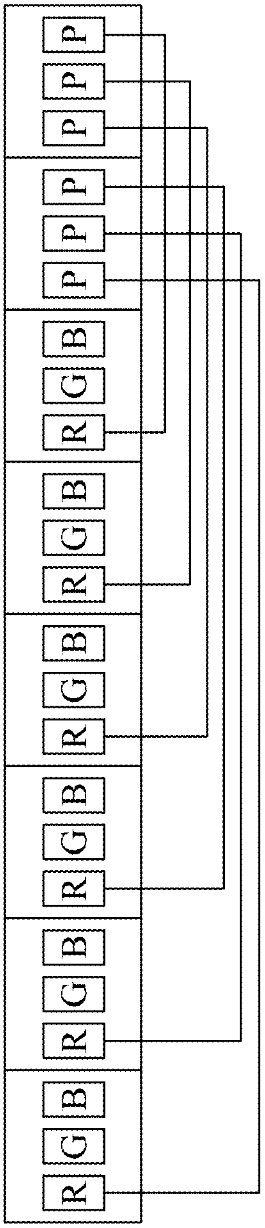

Referring to FIG. 2B, FIG. 2B is a schematic diagram of the PWM circuit P controlling the sub-pixel circuits R, G, B according to another embodiment of the present disclosure. In the example of FIG. 2B, one PWM circuit P can be used to control one of the sub-pixel circuits R, G and B. In such an embodiment, each of the sub-pixel circuits R, G, or and B may be individually regulated so that a luminous efficiency of each of the sub-pixel circuits R, G, and B is improved, or the sub-pixel circuit R, which has a lower efficiency, may be regulated to improve the overall efficiency.

Figure 3:
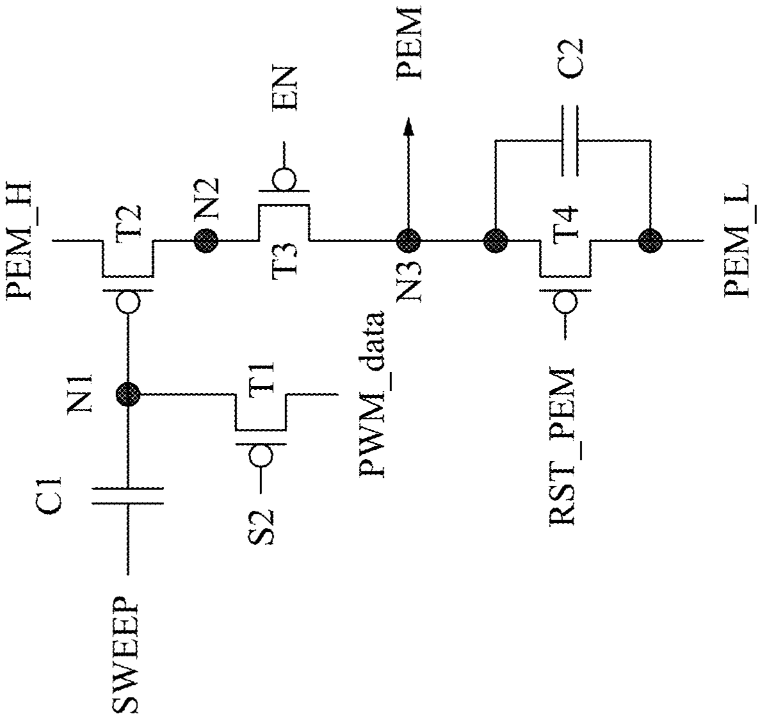
FIG. 3 is a schematic diagram of a pulse width modulation circuit according to an embodiment of the present disclosure.

Referring to FIG. 3, FIG. 3 is a schematic diagram of the PWM circuit P according to an embodiment of the present disclosure. The PWM circuit P includes a first capacitor C1, a first transistor T1, a second transistor T2, a third transistor T3, a fourth transistor T4, and a second capacitor C2.

A first terminal of the first capacitor C1 receives the ramp signal, and a second terminal of the first capacitor C1 is electrically coupled to a first node N1. A first terminal of the first transistor T1 is electrically coupled to the first node N1, a second terminal of the first transistor T1 receives the pulse width modulation data PWM_data, and a control terminal of the first transistor T1 receives a second scanning signal S2. A first terminal of the second transistor T2 is electrically coupled to a system high voltage PEM_H, and a control terminal of the second transistor T2 is electrically coupled to the first node N1. A first terminal of the third transistor T3 is electrically coupled to a second node N2, a second terminal of the third transistor T3 is electrically coupled to a third node N3, and a control terminal of the third transistor T3 receives an emission signal EM. A first terminal of the fourth transistor T4 is electrically coupled to the third node N3, a second terminal of the fourth transistor T4 is electrically coupled to a system low voltage PEM_L, and a control terminal of the fourth transistor T4 receives a reset signal RST_PEM. A first terminal of the second capacitor C2 is electrically coupled to the third node N3, and a second terminal of the second capacitor C2 is electrically coupled to the system low voltage PEM_L.

The pulse width modulation circuit P generates the control signal PEM at the third node N3 based on the pulse width modulation data PWM_data, the second scanning signal S2, the emission signal EM, the reset signal RST_PEM, the ramp signal SWEEP, the system high voltage PEM_H and the system low voltage PEM_L. The control signal PEM is then transmitted to the sub-pixel circuit R, G, B via the third node N3 to control the timing of the driving current ILED flowing through the light emitting element LED in the sub-pixel circuit R, G, B.

Figure 4:
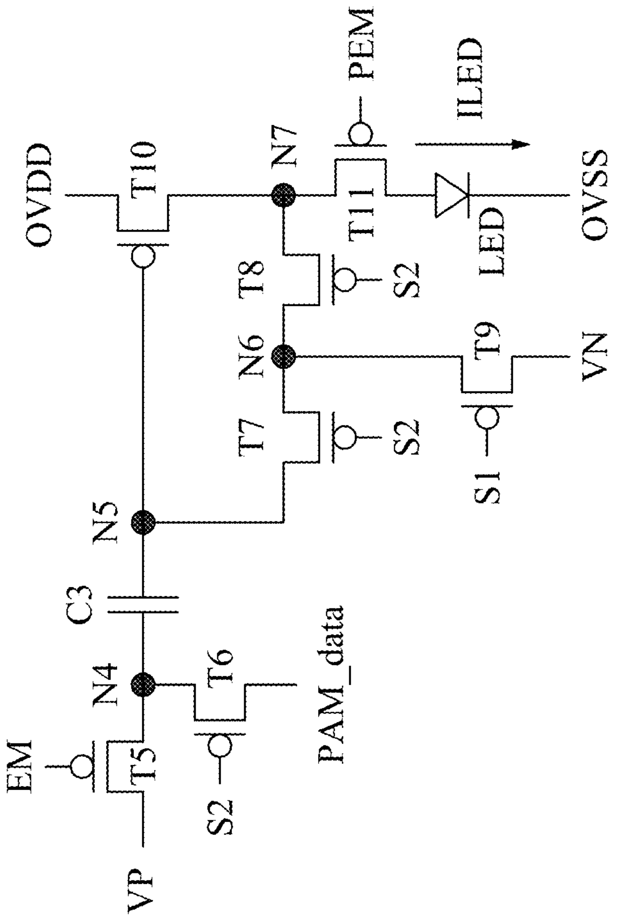
FIG. 4 is a schematic diagram of a sub-pixel circuit according to an embodiment of the present disclosure.

Referring to FIG. 4, FIG. 4 is a schematic diagram of the sub-pixel circuit R, G, B according to an embodiment of the present disclosure, in which the sub-pixel circuits R, G, and B may be viewed as PAM circuits. Each of the sub-pixel circuits (R, G, or B) includes a fifth transistor T5, a sixth transistor T6, a third capacitor C3, a seventh transistor T7, an eighth transistor T8, a ninth transistor T9, a tenth transistor T10, and an eleventh transistor T11.

A first terminal of the fifth transistor T5 receives a first reference voltage VP, a second terminal of the fifth transistor T5 is electrically coupled to a fourth node N4, and a control terminal of the fifth transistor T5 receives the emission signal EM. A first terminal of the sixth transistor T6 is electrically coupled to the fourth node N4, a second terminal of the sixth transistor T6 is electrically receives the pulse amplitude modulation data PAM_data, and a control terminal of the sixth transistor T6 receives the second scanning signal S2. A first terminal of the third capacitor C3 is electrically coupled to the fourth node N4, and a second terminal of the third capacitor C3 is electrically coupled to a fifth node N5. A first terminal of the seventh transistor T7 is electrically coupled to the fifth node N5, a second terminal of the seventh transistor T7 is electrically to a sixth node N6, and a control terminal of the seventh transistor T7 receives the second scanning signal S2.

A first terminal of the eighth transistor T8 is electrically coupled to the sixth node N6, a second terminal of the eighth transistor T8 is electrically to a seventh node N7, and a control terminal of the eighth transistor T8 receives the second scanning signal S2. A first terminal of the ninth transistor T9 is electrically coupled to the sixth node N6, a second terminal of the ninth transistor T9 receives a second reference voltage VN, and a control terminal of the ninth transistor T9 receives a first scanning signal S1. A first terminal of the tenth transistor T10 receives a system high voltage OVDD, a second terminal of the tenth transistor T10 is electrically coupled to a seventh node N7, and a control terminal of the tenth transistor T10 is electrically coupled to the fifth node N5. A first terminal of the eleventh transistor T11 is electrically coupled to the seventh node N7, a second terminal of the eleventh transistor T11 is electrically coupled to an anode of the light emitting element LED, and the control terminal of the eleventh transistor T11 is electrically coupled to the third node N3 of the PWM circuit P to receive the control signal PEM. A cathode of the light emitting element LED receives a system low voltage OVSS.

Based on the PWM circuit P and the sub-pixel circuits R, G, and B, the pulse amplitude modulation data PAM_data determines a magnitude of the driving current ILED (i.e., luminous intensity or brightness) flowing through the light emitting element, while the synthesized signal of the ramp signal SWEEP and the pulse width modulation data PWM_data determine the duration of the driving current ILED (i.e., the luminous time) flowing through the light emitting element.

Figure 5:
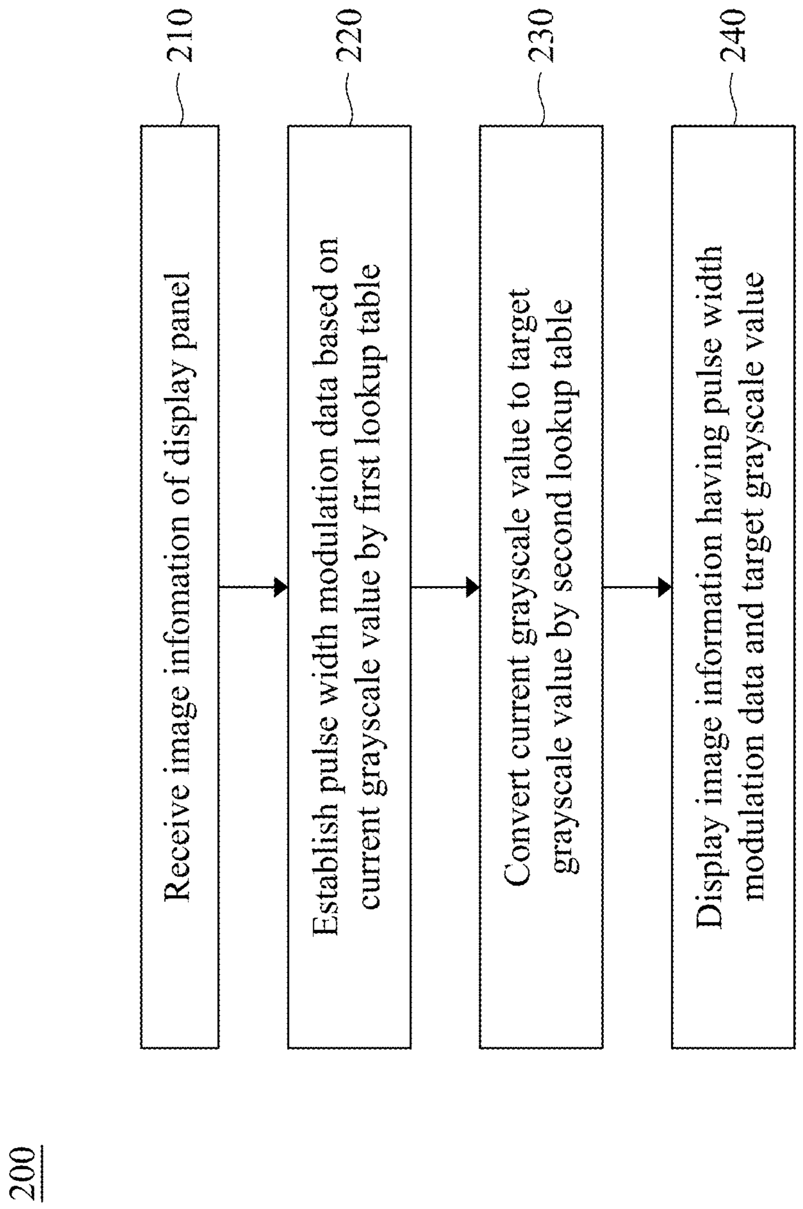
FIG. 5 is a schematic diagram of a driving method of a display panel according to an embodiment of the present disclosure.

Referring to FIG. 5, FIG. 5 is a schematic diagram of a driving method 200 of a display panel according to an embodiment of the present disclosure. The driving method 200 includes Steps 210 to 240, and the present disclosure can be better understood with the schematic diagrams illustrated in FIGS. 6 to 11.

Figure 6:
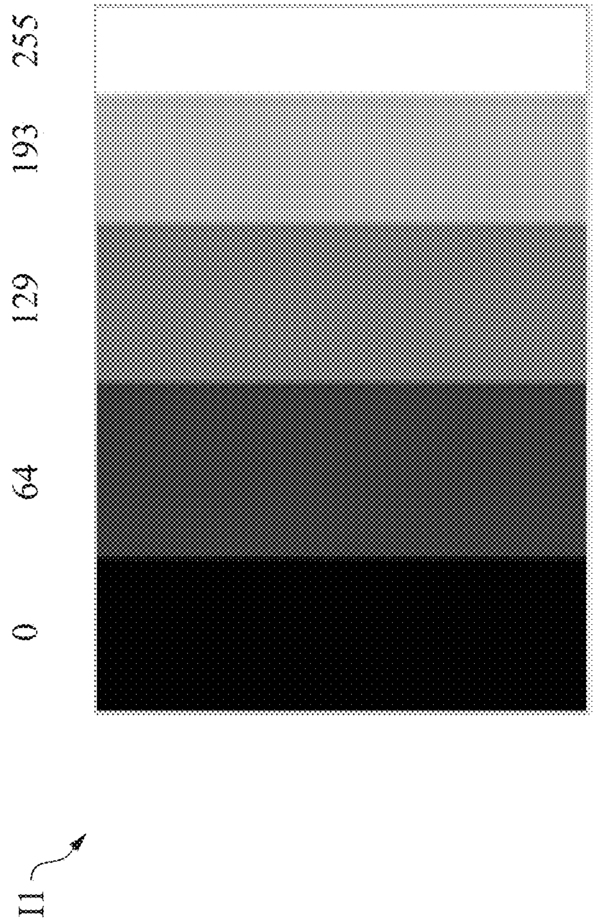
FIGS. 6 to 9 are schematic diagrams of the application of the driving method to generate image information with a pulse width modulation data and target grayscale values according to an embodiment of the present disclosure.

At Step 210, the image information I1 of the display panel 110 is first received to obtain the current grayscale values R1, G1, and B1 for the sub-pixel circuits R, G, and B. In the example of FIG. 6, the image information I1 has a resolution of [156]×[156] and includes five grayscale blocks corresponding to five current grayscale values of 0, 64, 129, 193, and 255.

Figure 7:
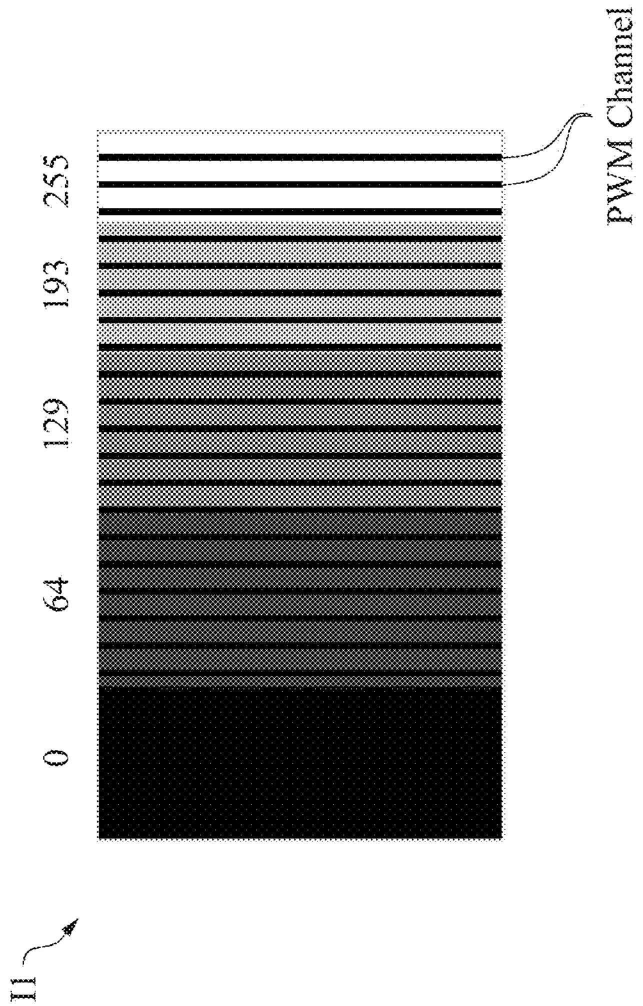

Then, the operating module 121 adds multiple PWM channels in the image information I1 for subsequently establishing the pulse width modulation data PWM_data. As shown in FIG. 7, the image information I1 is added with multiple PWM channels in a horizontal width so that the resolution is changed from the original [156]×[156] to [156]×[208]. In the current state where the pulse width modulation data PWM_data has not yet been established, each PWM channel is in black grayscale.

At Step 220, the pulse width modulation data PWM_data of each PWM channel is established by referring to the first lookup table L1 based on the current grayscale values R1, G1, and B1 of the sub-pixel circuits R, G, and B.

Figure 8:
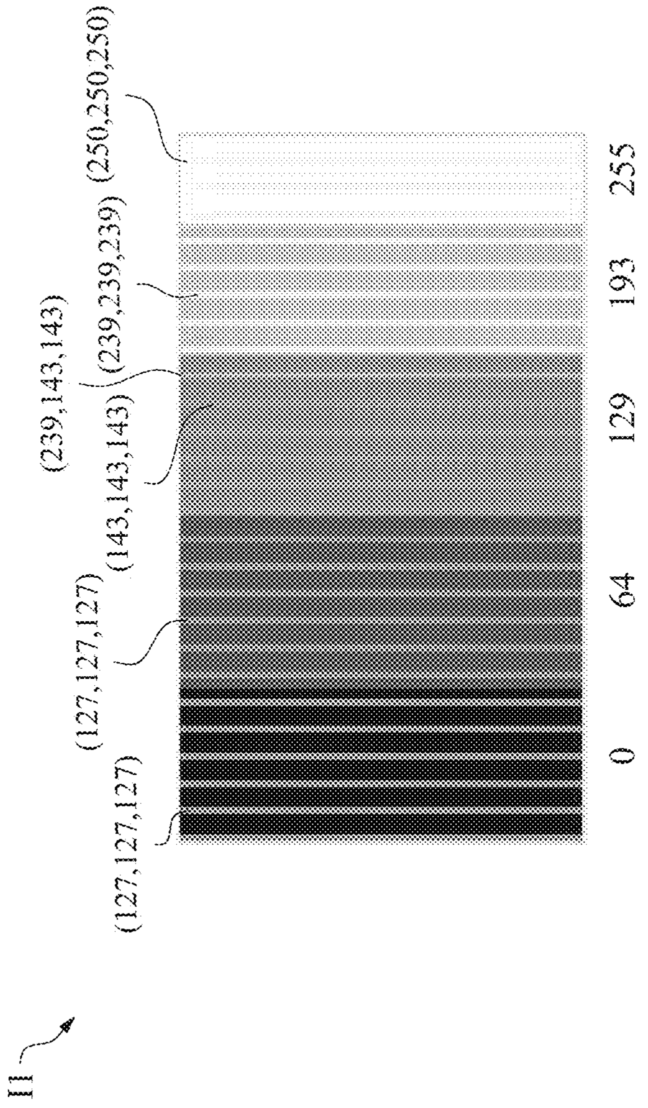

Referring to FIGS. 8 and 10, in the grayscale block where the current grayscale values R1, G1 and B1 of the image information I1 are 0, which corresponds to a first step of the first lookup table L1 (i.e., the current grayscale value is between 0 and 95), the pulse width modulation data PWM_data with grayscale values R2, G2, and B2 of 127 are set to the PWM channel to control the sub-pixel circuits R, G, and B respectively. In other words, in the grayscale block where the current grayscale value of the image information I1 is 0, the pulse width modulation data PWM_data established by the sub-pixel circuits R, G, and B are 3.3V, 2.8V, and 3.3V, respectively, and their corresponding grayscale values R2, G2, and B2 can be expressed as (127,127,127).

In the grayscale block where the current grayscale values R1, G1 and B1 of the image information I1 are 129, which corresponds to a second step of the first lookup table L1 (i.e., the current grayscale value is between 0 and 95), the pulse width modulation data PWM_data with grayscale values R2, G2, and B2 of 143 are set to the PWM channel to control the sub-pixel circuits R, G, and B respectively. In other words, in the grayscale block where the current grayscale value of the image information I1 is 129, the pulse width modulation data PWM_data established by the sub-pixel circuits R, G, and B are 3.7V, 3.1V, and 3.4V, respectively, and their corresponding grayscale values R2, G2, and B2 can be expressed as (143,143,143).

In the grayscale block where the current grayscale values R1, G1 and B1 of the image information I1 are 193, which corresponds to a third step of the first lookup table L1 (i.e., the current grayscale value is between 169 and 216), the pulse width modulation data PWM_data with grayscale values R2, G2, and B2 of 239 are set to the PWM channel to control the sub-pixel circuits R, G, and B respectively. In other words, in the grayscale block where the current grayscale value of the image information I1 is 193, the pulse width modulation data PWM_data established by the sub-pixel circuits R, G, and B are 4.7V, 4.2V, and 4.5V, respectively, and their corresponding grayscale values R2, G2, and B2 can be expressed as (239,239,239).

In the grayscale block where the current grayscale values R1, G1 and B1 of the image information I1 are 255, which corresponds to a fourth step of the first lookup table L1 (i.e., the current grayscale value is between 217 and 255), the pulse width modulation data PWM_data with grayscale values R2, G2, and B2 of 250 are set to the PWM channel to control the sub-pixel circuits R, G, and B respectively. In other words, in the grayscale block where the current grayscale value of the image information I1 is 255, the pulse width modulation data PWM_data established by the sub-pixel circuits R, G, and B are 5.4V, 5.1V, and 5.2V, respectively, and their corresponding grayscale values R2, G2, and B2 can be expressed as (250,250,250).

After performing Step 220, Step 230 is then performed to convert the current grayscale values R1, G1, and B1 of the sub-pixel circuits R, G, and B to the target grayscale values RT, GT, and BT by referring to the second lookup table L2.

Figure 9:
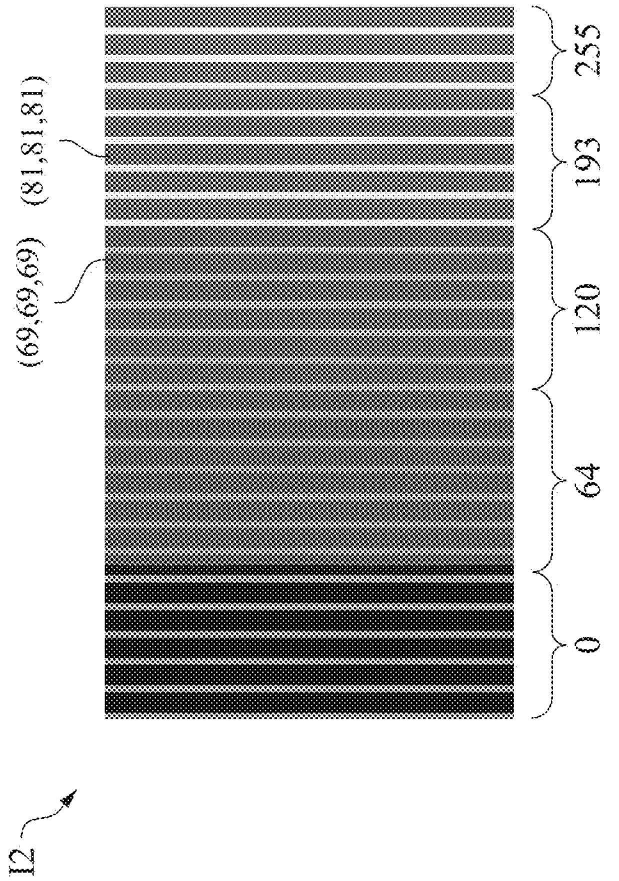

Referring to FIGS. 9 and 11, in the grayscale block where the current grayscale values R1, G1 and B1 of the image information I1 are 129, which corresponds to the second step of the second lookup table L2 (i.e., the current grayscale value is between 96 and 168), and the target grayscale values RT, GT and BT to be converted are between the grayscale values 51 and 90. The current grayscale value of 129 is converted to the target grayscale value of 69 by an interpolation method, which is represented as (69,69,69) in FIG. 9.

In the grayscale block where the current grayscale values R1, G1 and B1 of the image information I1 are 193, which corresponds to the third step of the second lookup table L2 (i.e., the current grayscale value is between 169 and 216), and the target grayscale values RT, GT and BT to be converted are between the grayscale values 71 and 90. The current grayscale value of 193 is converted to the target grayscale value of 81 by the interpolation method, which is represented as (81,81,81) in FIG. 9. Similarly, the current grayscale values R1, G1, and B1 of all grayscale blocks are converted to the target grayscale values RT, GT, and BT. As a result, the image information I1 has been converted to the new image information I2.

At Step 240, the new image information I2 is transmitted to the driving circuit 130 through the control system 120, and the driving circuit 130 further drives the display panel 110 to display the image information I2 with the pulse width modulation data PWM_data and the target grayscale values RT, GT, and BT.

Figure 12:
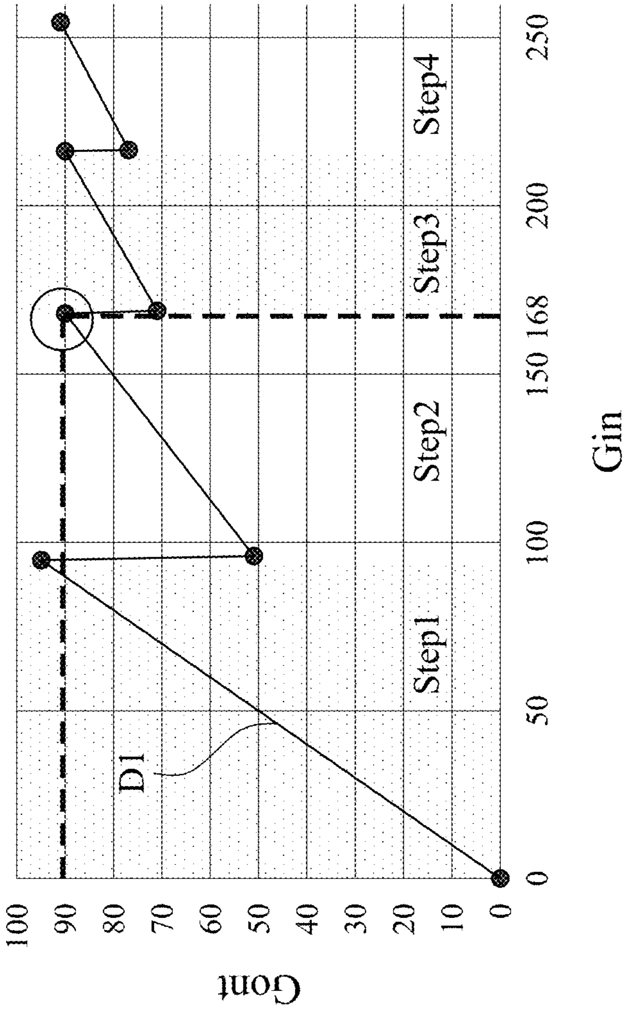
FIG. 12 is a schematic diagram of a relationship between input grayscale values and output grayscale values of the second lookup table according to an embodiment of the present disclosure.

In an embodiment of the present disclosure, the driving method 200 also includes establishing a second lookup table L2. As shown in FIG. 12, several grayscale intervals (or means steps) Step1 to Step4 are first generated based on the ramp signal SWEEP and the duty cycle multiplier corresponding to the ramp signal SWEEP, so as to divide the input grayscale values Gin (grayscale values 0 to 255) of the horizontal axis into the grayscale intervals Step1 to Step4.

In an embodiment of the present disclosure, the input grayscale values 0 to 95 are divided to the grayscale interval Step1, the input grayscale values 96 to 168 are divided to the grayscale interval Step2, the input grayscale values 169 to 216 are divided to the grayscale interval Step3, and the input grayscale values 217 to 255 are divided to the grayscale interval Step4.

In the embodiment of the present disclosure, the ramp signal SWEEP may be preset with corresponding duty cycle multipliers so that it can be synthesized with different pulse width modulation data PWM_data to produce luminous times of different widths. In the embodiment of the present disclosure, the duty cycle multiplier of the grayscale interval Step1 is smaller than the duty cycle multipliers of the other grayscale intervals Step1 to Step4. In other words, the grayscale interval Step1 has the luminous time with the narrowest width, and the grayscale interval Step4 has the luminous time with the largest width.

Then, adjust the input grayscale value Gin (grayscale values 0 to 95) of the grayscale interval Step1 by the gamma curve, so that the grayscale values 0 to 95 are bound with a target brightness, and a ramp line D1 is generated in the grayscale interval Step1. As the values recorded in the second lookup table L2 in FIG. 11, in the grayscale interval Step1, the output grayscale values Gout (corresponding to the target grayscale values RT, GT and BT) are the same as the input grayscale values Gin (corresponding to the current grayscale values R1, G1 and B1).

After the target brightness of the input grayscale values in the grayscale interval Step1 is bound, the target brightness of the input grayscale values Gin (grayscale values 96 to 255) in the other grayscale intervals Step2 to Step4 are calculated by the gamma curve.

Then, a value is taken from the input grayscale values 0 to 95 in the grayscale interval Step1, and the output grayscale values Gout (the values taken from the grayscale interval Step1) to which the input grayscale values (grayscale values 96 to 255) in the other grayscale intervals Step2 to Step4 need to be converted to achieve the target brightness based on the duty cycle multipliers are each recorded.

In detail, since the other grayscale intervals Step2 to Step4 have a wider luminous time compared to the grayscale interval Step1, only a lower output grayscale value Gout is required to achieve the desired target brightness. For example, a luminous time of the grayscale interval Step2 is greater than that of the grayscale interval Step1, so when the input grayscale value of 168 in the grayscale interval Step2 is referenced to the grayscale interval Step1, only an output grayscale value of 90 is actually required to achieve the desired target brightness with the input grayscale value of 168.

Similarly, based on the duty cycle multipliers in different grayscale intervals Step2 to Step4, the output grayscale values Gout required for the other input grayscale values from 96 to 255 are recorded to construct the second lookup table L2 shown in FIG. 11. In the embodiment of the present disclosure, the second lookup table L2 is only constructed with the converted output grayscale values that correspond to the minimum input grayscale value and the maximum input grayscale value in each of the grayscale intervals Step2 to Step4, and the output grayscale values for the other input grayscale values (in each of the grayscale intervals Step2 to Step4) may be calculated by the interpolation method.

It is worth noting that the target grayscale values RT, GT, and BT obtained by the second lookup table L2 are between 0 and 95, and the main purpose is to adjust the pulse amplitude modulation data PAM_data with the ramp signal SWEEP. When the luminous time generated by the ramp signal SWEEP is longer (i.e., in the grayscale intervals Step2 to Step4, where the luminous time is larger than that of the grayscale interval Step1), the pulse amplitude modulation data PAM_data may be adjusted downward to output a grayscale value between 0 and 95.

Figure 13:
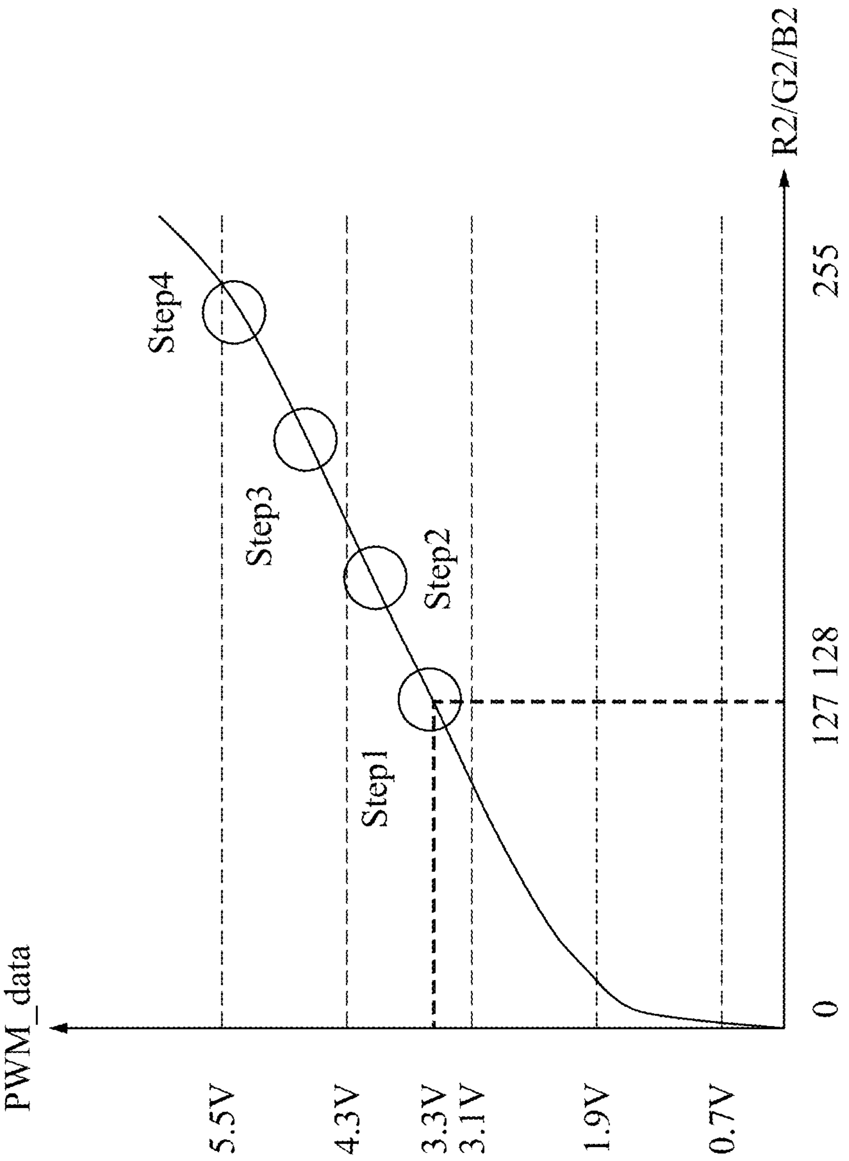
FIG. 13 is a schematic diagram of a relationship between a pulse width modulation data and output grayscale values of the first lookup table according to an embodiment of the present disclosure.

In an embodiment of the present disclosure, the driving method 200 further includes establishing the first lookup table L1. As shown in FIG. 13 and the first lookup table L1, the grayscale values in each grayscale interval Step1 to Step4 are the same as those in the second lookup table L2, with the grayscale interval Step1 including grayscale values 0 to 95, the grayscale interval Step2 including grayscale values 96 to 168, the grayscale interval Step3 including grayscale values 169 to 216, and the grayscale interval Step4 including grayscale values 217 to 255. In the embodiment of the disclosure, the voltage values of the pulse width modulation data PWM_data required for each grayscale interval Step1 to Step4 may be set as a default (or desired) value at the beginning of the hardware circuit design, and the grayscale values R2, G2, B2 may be calculated from the gamma curve and the target brightness bound to each grayscale value (as mentioned above when describing the establish of the second lookup table L2, and will not repeated herein), thereby obtaining the voltage values of the pulse amplitude modulation data PAM_data required for each of the grayscale values R2, G2, and B2. The curve as shown in FIG. 13 can be plotted by obtaining the voltage values of the pulse width modulation data PWM_data and the voltage values of the pulse amplitude modulation data PAM_data, and the first lookup table L1 shown in FIG. 10 can further be established.

In the embodiment of the disclosure, since the voltage value of the pulse width modulation data PWM_data and the voltage value of the pulse amplitude modulation data PAM_data are controlled by the same gamma curve, and the pulse width modulation data PWM_data only outputs the target grayscale value between 0 and 95, which means that the voltage values corresponding to the other grayscale values from 96 to 255 are not used. Therefore, the voltage values (corresponding to grayscale values from 96 to 255) of the pulse width modulation data PWM_data may be set arbitrarily. In some embodiments, the range of the voltage values of the pulse width modulation data PWM_data is set to larger than the voltage value of the grayscale value 95 and smaller than the maximum value of the system data voltage.

In summary, the display device and the driving method of the display panel of the present disclosure generate new image information having pulse width modulation data and a target grayscale value by embedding the pulse width modulation data into the image information and adjusting the pulse amplitude modulation data to the lower target grayscale value. As a result, the low and medium grayscale can be controlled to have a narrower luminous width and higher LED driving current, so that the low and medium grayscale can also be maintained at a high luminous efficiency point, improving the overall luminous efficiency.

Although the present disclosure has been disclosed as above in embodiments, the embodiments are not intended to limit the present disclosure, and those of ordinary skill in the art may make some changes and embellishments within the spirit and scope of the present disclosure, therefore, the scope of protection of the present disclosure shall be defined in the attached claims.

What is claimed is:

1. A display device, comprising:

a display panel, comprising:

a plurality of pixel groups, wherein each of the pixel groups comprises:

a plurality of sub-pixel circuits configured to each receive a pulse amplitude modulation data and control a luminous intensity of the sub-pixel circuits based on the pulse amplitude modulation data; and a pulse width modulation circuit configured to receive a pulse width modulation data and control a luminous time of the sub-pixel circuits based on the pulse width modulation data; and a control system configured to perform steps comprising:

receiving an image information of the display panel, wherein the image information comprises a current grayscale value of each of the sub-pixel circuits;

establishing the pulse width modulation data for each of the sub-pixel circuits based on the current grayscale value by a first lookup table, wherein the first lookup table comprises a plurality of input grayscale intervals and a plurality of output pulse width modulation data, each of the input grayscale intervals corresponding to one of the output pulse width modulation data, wherein the pulse width modulation data for each of the sub-pixel circuits is established based on the output pulse width modulation data corresponding to one of the input grayscale intervals within which the current grayscale value of said sub-pixel circuit falls;

adding a plurality of grayscale values corresponding to the pulse width modulation data based on the first lookup table to the image information;

converting the current grayscale value to a target grayscale value for each of the sub-pixel circuits by a second lookup table, wherein the target grayscale value corresponds to the pulse amplitude modulation data, and the second lookup table comprises the plurality of input grayscale intervals and a plurality of output grayscale intervals, each of the input grayscale intervals corresponding to one of the output grayscale intervals, wherein the target grayscale value for each of the sub-pixel circuits is converted based on the output grayscale interval corresponding to one of the input grayscale intervals within which the current grayscale value of said sub-pixel circuits falls; and controlling the display panel to display the image information having the pulse width modulation data and the target grayscale values.

2. The display device according to claim 1, wherein the sub-pixel circuits comprise a red sub-pixel circuit, a green sub-pixel circuit, and a blue sub-pixel circuit.

3. The display device according to claim 2, wherein the red sub-pixel circuit, the green sub-pixel circuit and the blue sub-pixel circuit are each controlled by different pulse width modulation circuit.

4. The display device according to claim 2, wherein the red sub-pixel circuit, the green sub-pixel circuit and the blue sub-pixel circuit are controlled by the same pulse width modulation circuit.

5. The display device according to claim 1, wherein the control system is further configured to establish the second lookup table, and establishing the second lookup table comprises:

generating the input grayscale intervals based on a ramp signal and a duty cycle multiplier corresponding to the ramp signal to divide a plurality of input grayscale values into the input grayscale intervals, wherein the duty cycle multiplier corresponding to a first input grayscale interval of the input grayscale intervals is less than the duty cycle multipliers corresponding to the other input grayscale intervals;

calculating a target brightness of each of the input grayscale values from a gamma curve; and recording a plurality of output grayscale values to which the input grayscale values in the other input grayscale intervals required to be converted to achieve the target brightness based on the duty cycle multipliers, wherein the output grayscale values are values taken from the input grayscale values in the first input grayscale interval.

6. The display device according to claim 5, wherein the input grayscale values in the first input grayscale interval comprise 0 to 95.

7. The display device according to claim 5, wherein the control system further comprises:

a ramp signal generation circuit configured to generate the ramp signal and provide the ramp signal to the pulse width modulation circuit.

8. The display device according to claim 1, further comprising:

a driving circuit electrically connected between the display panel and the control system, and configured to drive the pixel groups on the display panel.

9. The display device according to claim 1, wherein the pulse width modulation circuit comprises:

a first capacitor, a first terminal of the first capacitor receives a ramp signal, and a second terminal of the first capacitor is electrically coupled to a first node;

a first transistor, a first terminal of the first transistor is electrically coupled to the first node, a second terminal of the first transistor receives the pulse width modulation data, and a control terminal of the first transistor receives a second scanning signal;

a second transistor, a first terminal of the second transistor is electrically coupled to a first system voltage, and a control terminal of the second transistor is electrically coupled to the first node;

a third transistor, a first terminal of the third transistor is electrically coupled to a second terminal of the second transistor, a second terminal of the third transistor is electrically coupled to a third node, and a control terminal of the third transistor receives an emission signal;

a fourth transistor, a first terminal of the fourth transistor is electrically coupled to the third node, a second terminal of the fourth transistor is electrically coupled to a second system voltage, and a control terminal of the fourth transistor receives a reset signal; and a second capacitor, a first terminal of the second capacitor is electrically coupled to the third node, and a second terminal of the second capacitor is electrically coupled to the second system voltage.

10. The display device according to claim 9, wherein each of the sub-pixel circuits comprises:

a light emitting element, a cathode of the light emitting element receives a third system voltage;

a fifth transistor, a first terminal of the fifth transistor receives a first reference voltage, a second terminal of the fifth transistor is electrically coupled to a fourth node, and a control terminal of the fifth transistor receives the emission signal;

a sixth transistor, a first terminal of the sixth transistor is electrically coupled to the fourth node, a second terminal of the sixth transistor is electrically receives the pulse amplitude modulation data, and a control terminal of the sixth transistor receives the second scanning signal;

a third capacitor, a first terminal of the third capacitor is electrically coupled to the fourth node, and a second terminal of the third capacitor is electrically coupled to a fifth node;

a seventh transistor, a first terminal of the seventh transistor is electrically coupled to the fifth node, a second terminal of the seventh transistor is electrically to a sixth node, and a control terminal of the seventh transistor receives the second scanning signal;

an eighth transistor, a first terminal of the eighth transistor is electrically coupled to the sixth node, a second terminal of the eighth transistor is electrically to a seventh node, and a control terminal of the eighth transistor receives the second scanning signal;

a ninth transistor, a first terminal of the ninth transistor is electrically coupled to the sixth node, a second terminal of the ninth transistor receives a second reference voltage, and a control terminal of the ninth transistor receives a first scanning signal;

a tenth transistor, a first terminal of the tenth transistor receives a fourth system voltage, a second terminal of the tenth transistor is electrically coupled to a seventh node, and a control terminal of the tenth transistor is electrically coupled to the fifth node; and an eleventh transistor, a first terminal of the eleventh transistor is electrically coupled to the seventh node, a second terminal of the eleventh transistor is electrically coupled to an anode of the light emitting element, and the control terminal of the eleventh transistor is electrically coupled to the third node.

11. A driving method of a display panel having a plurality of pixel groups, each of the pixel groups having a plurality of sub-pixel circuits, the driving method comprising:

receiving an image information of the display panel, wherein the image information comprises a current grayscale value of each of the sub-pixel circuits;

establishing a pulse width modulation data for each of the sub-pixel circuits based on the current grayscale value by a first lookup table, wherein the first lookup table comprises a plurality of input grayscale intervals and a plurality of output pulse width modulation data, each of the input grayscale intervals corresponding to one of the output pulse width modulation data, wherein the pulse width modulation data for each of the sub-pixel circuits is established based on the output pulse width modulation data corresponding to one of the input grayscale intervals within which the current grayscale value of said sub-pixel circuit falls;

adding a plurality of grayscale values corresponding to the pulse width modulation data based on the first lookup table to the image information;

converting the current grayscale value to a target grayscale value for each of the sub-pixel circuits by a second lookup table, wherein the target grayscale value corresponds to a pulse amplitude modulation data, and the second lookup table comprises the plurality of input grayscale intervals and a plurality of output grayscale intervals, each of the input grayscale intervals corresponding to one of the output grayscale intervals, wherein the target grayscale value for each of the sub-pixel circuits is converted based on the output grayscale interval corresponding to one of the input grayscale intervals within which the current grayscale value of said sub-pixel circuits falls; and displaying the image information having the pulse width modulation data and the target grayscale values.

12. The driving method according to claim 11, wherein the driving method further comprises establishing the second lookup table, comprising:

generating the input grayscale intervals based on a ramp signal and a duty cycle multiplier corresponding to the ramp signal to divide a plurality of input grayscale values into the input grayscale intervals, wherein the duty cycle multiplier corresponding to a first input grayscale interval of the input grayscale intervals is less than the duty cycle multipliers corresponding to the other input grayscale intervals;

calculating a target brightness of each of the input grayscale values from a gamma curve; and recording a plurality of output grayscale values to which the input grayscale values in the other input grayscale intervals required to be converted to achieve the target brightness based on the duty cycle multipliers, wherein the output grayscale values are values taken from the input grayscale values in the first input grayscale interval.

13. The driving method according to claim 12, wherein the input grayscale values in the first input grayscale interval comprise 0 to 95.

14. The driving method according to claim 11, wherein the pixel groups further comprises at least one pulse width modulation circuit, the sub-pixel circuits comprise a red sub-pixel circuit, a green sub-pixel circuit and a blue sub-pixel circuit, and wherein the red sub-pixel circuit, the green sub-pixel circuit and the blue sub-pixel circuit are each controlled by different one of the at least one pulse width modulation circuit.

15. The driving method according to claim 11, wherein the pixel groups further comprises at least one pulse width modulation circuit, the sub-pixel circuits comprise a red sub-pixel circuit, a green sub-pixel circuit and a blue sub-pixel circuit, and wherein the red sub-pixel circuit, the green sub-pixel circuit and the blue sub-pixel circuit are controlled by the same one of the at least one pulse width modulation circuit.

* * * * *